Dec. 13, 1955
B. F. ARPS
2,726,903
LONGITUDINAL AND TRANSVERSELY ADJUSTABLE
CARRIER FOR SUPPLEMENTAL TRACTOR WHEELS
Filed Feb. 5, 1954
2 Sheets-Sheet 1
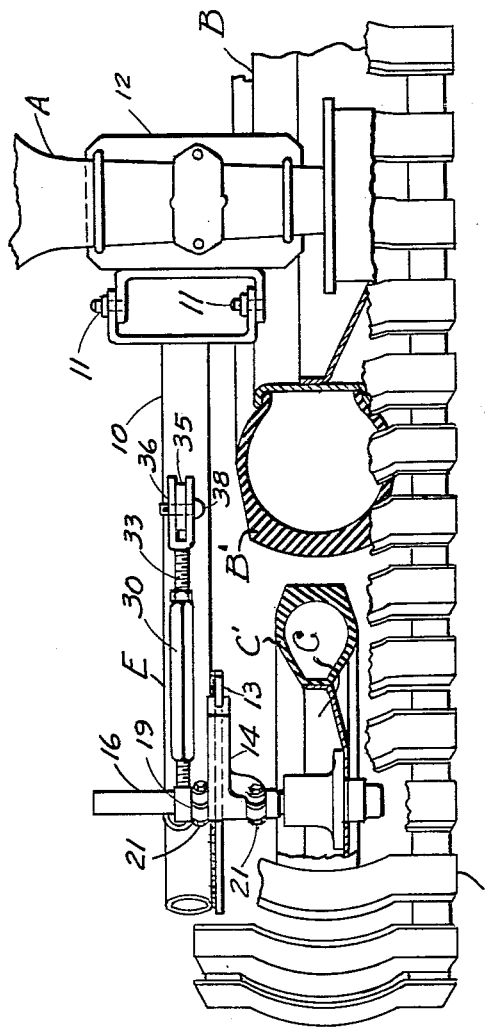
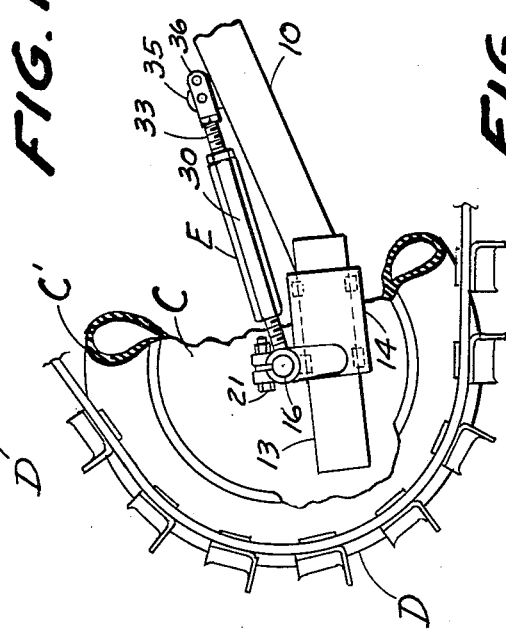
INVENTOR.
BRUNO F. ARPS
BY *A. S. Kroh*

Dec. 13, 1955 B. F. ARPS 2,726,903
LONGITUDINAL AND TRANSVERSELY ADJUSTABLE
CARRIER FOR SUPPLEMENTAL TRACTOR WHEELS
Filed Feb. 5, 1954 2 Sheets-Sheet 2
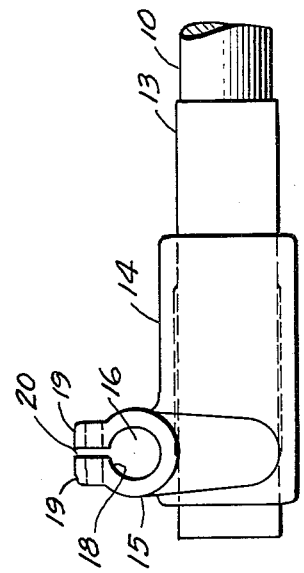
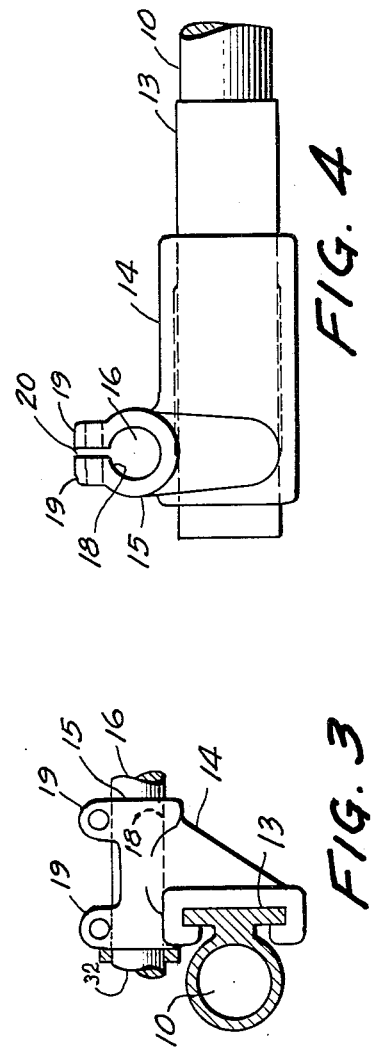
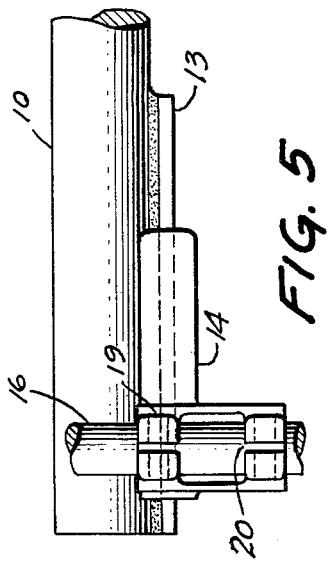
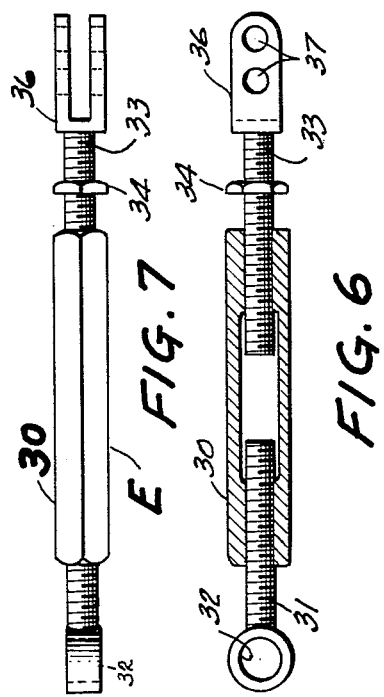
INVENTOR.
BRUNO F. ARPS
BY *A. S. Kroh*

United States Patent Office 2,726,903
Patented Dec. 13, 1955

2,726,903

LONGITUDINAL AND TRANSVERSELY ADJUSTABLE CARRIER FOR SUPPLEMENTAL TRACTOR WHEELS

Bruno F. Arps, New Holstein, Wis., assignor to Arps Corporation, New Holstein, Wis.

Application February 5, 1954, Serial No. 408,428

1 Claim. (Cl. 305—8)

An object of the present invention is to provide a more practical manner of carrying and adjusting the supplemental wheels which carry one end of the track of a half track attachment for tractors.

The present invention relates to a half track attachment of the character described and shown in my co-pending application No. 348,997, April 15, 1953, now Pat. No. 2,719,062.

The services rendered by half track tractor attachments are necessarily very severe, because they must be operated at a time when conventional tractors without an attachment are not satisfactory; therefore applicant has devised the device described and shown in this application as a marked improvement over former known devices.

To these and other useful ends my invention relates to parts, combinations of parts or their equivalents and mode of operation and adjustments, as hereinafter described and claimed and shown in the accompanying drawings in which:

Fig. 1 illustrates fractionally and partially sectioned a top view of my invention.

Fig. 2 illustrates a fractional side view of my invention, as illustrated in Figure 1.

Fig. 3 illustrates fractionally a front view of my invention.

Fig. 4 illustrates fractionally a side view of the device as shown in Figure 3.

Fig. 5 is a top view of the device as illustrated in Figures 3 and 4.

Fig. 6 is a partially longitudinally sectioned view of the turn-buckle used for longitudinally adjusting the supplemental wheels on their carrying arms.

Fig. 7 is another view of the element shown in Figure 6.

It will be seen by viewing the figures that applicant's device was particularly devised for the purpose outlined in the preamble of this specification and shown in the drawings wherein reference character A designates fractionally the left hand rear axle housing of a conventional tractor. Reference character B' designates fractionally the rubber tire of the left hand rear carrying wheel B of the tractor each shown in section, wheel B being secured to the protruding ends of the tractor axles carried by member A. Reference character C designates fractionally a supplemental wheel having a rubber tire C' which carries the free end of the half track designated by reference character D. Member D may be of any conventional design. I prefer, however, the design shown in my co-pending application, Serial Number 348,997, filed April 15, 1953, now Pat. No. 2,719,062.

I provide arms 10 which are preferably hinged at their rear ends as at 11—11 to brackets 12 which are secured to housings A.

The combination of parts constituting the major part of applicant's invention are mounted on the free end of member 10 as follows: an elongated plate 13 is welded to the free end of member 10 as illustrated in Figures 3, 4 and 5. I provide a bracket 14 which is slidably mounted on plate 13 having preferably on its upper side an extension 15 with a spindle 16 extending therethrough on which wheel C is rotatably mounted, the wheel being adapted preferably to carry rubber tire C'.

Opening 18 in bracket 14 is adapted to snugly embrace spindle 16 having ears 19—19 which are split as at 20 and openings for bolts 21—21 (see Figures 1 and 2) so spindle 16 may be firmly held to the bracket but longitudinally adjusted. Wheel C is rotatably mounted on one end of spindle 16 and is held from end movement on the spindle by suitable collars. Thus wheel C may be positioned in alignment with tractor wheel B; this tractor wheel is generally longitudinally adjustable on the protruding end of its axle; therefore supplemental wheel C must be adjustably held on its carrying arm so the wheel is suitably positioned for carrying track D.

In order to place track D on tires B' and C', wheel C must be moved rearward by moving bracket 14 rearwardly, after which track D is given a suitable tautness by moving bracket 14 forward which is accomplished as follows:

A turnbuckle as shown in Figures 6 and 7 is designated by reference character E. This turnbuckle has a center base 30 and being preferably hexagonal in shape for its length, the front ends being adapted to screw threadedly receive a bolt 31, its front end having an opening 32 adapted to embrace spindle 16 as illustrated in Figure 1, the rearward end of member 30 being adapted to screw-threadedly receive a bolt 33 having a nut 34 for locking member 30 into its adjusted position. An anchor 35 (see Figure 2) is secured to member 10 in the position shown in Figures 1 and 2 and bolt 33 at its rear end is provided with an extension 36 adapted to loosely embrace anchor 35. Member 36 is provided preferably with spaced openings 37. I provide a pin 38 (see Figure 1) whereby member 36 may be held in the position shown in Figure 2 or moved forward to the rear opening 37 in member 36; thus turnbuckle E may be provided with a practical and reasonable length and still act to move bracket 14 for the full length of plate 13.

One of the advantages of applicant's design is that if the soil conditions develop that track D must be adjusted as to tautness, a condition which usually develops on a soft or muddy section of earth, the tractor operator may reach down without leaving the tractor seat and adjust the turnbuckles suitable for the soil condition at the spot where adjustment appears necessary. For example, track D may be operating successfully under what appears to be the necessary tautness and a condition suddenly appears making it necessary to adjust wheels C forward to meet the extreme condition.

In the above description reference is had to the assembly shown in Figure 1. It will be understood that two of these assemblies are used on a conventional tractor; therefore claims will follow covering a single assembly and double assemblies.

It will be seen that applicant has evolved a very simple and efficient support for half track attachments for tractors, which is simple, can be manufactured at low cost and is conveniently attached, adjusted and detached.

Having thus shown and described my invention, I claim:

A half track tensioning attachment for a wheeled, track-equipped, tractor having a pair of axle housings with an axle rotatably mounted in each housing, the outer ends of said axles protruding relative to the housings and carrying longitudinally adjustable driving wheels, comprising arms hingedly mounted at their inner ends on said housings and parallel to the axles, plates secured to the outer end portions of said arms, brackets slidably mounted on said plates, spindles transversely adjustably mounted on said brackets, supplemental wheels rotatably mounted on said spindles and adjustable for alinement with the driving wheels of the tractor, said supplemental wheels together with the driving wheels of the tractor mounting the endless track of the tractor, anchors secured to said arms remote from portions of the plates, and turnbuckles forming operative connections between the anchors and brackets for adjusting the tautness of the track.

References Cited in the file of this patent

UNITED STATES PATENTS

| | | |
|---|---|---|
| 2,314,295 | Wampfler | Mar. 16, 1943 |
| 2,587,813 | Bombardier | Mar. 4, 1952 |